United States Patent [19]

Humphries

[11] 4,329,940
[45] May 18, 1982

[54] FLOW APPARATUS

[76] Inventor: Walter R. Humphries, 32 Desswood Pl., Aberdeen, Scotland

[21] Appl. No.: 142,820

[22] Filed: Apr. 22, 1980

[30] Foreign Application Priority Data

Jul. 10, 1979 [GB] United Kingdom ............... 7923945

[51] Int. Cl.³ .......................................... A01K 39/024
[52] U.S. Cl. ..................................... 119/72; 119/78; 137/101.11
[58] Field of Search .................... 119/78, 77, 72, 81; 137/101.11, 101.25

[56] References Cited

U.S. PATENT DOCUMENTS

| | | | |
|---|---|---|---|
| 3,129,694 | 4/1964 | Arrington | 119/81 |
| 3,267,964 | 8/1966 | Steinmetz | 119/77 X |
| 3,368,580 | 2/1968 | Carter | 119/78 X |

*Primary Examiner*—Hugh R. Chamblee
*Attorney, Agent, or Firm*—Cushman, Darby & Cushman

[57] ABSTRACT

In a flow apparatus for adding liquid additive to drinking water for cattle, a drinking trough (13) is supplied with treated water from a header tank (18) topped up from a mains supply (15) in response to changes in level in the trough (13). A siphon (19) delivers water from the header tank (18) to the trough (13) down a primary tube (20) which is joined by a secondary tube (25) leading from an additive tray (22). Additive is sucked into the primary tube (20) without any substantial venturi effect, and is sucked at least predominately by the effect of displacement of liquid in the primary tube (20) below the junction (27), to ensure accurate dosage of additive. Preferably the primary tube (20) runs full substantially immediately after flow commences in the primary tube (20).

31 Claims, 4 Drawing Figures

FLOW APPARATUS

The present invention relates to flow apparatus for, and a method of, combining two liquids, and is concerned in particular, but not exclusively, with apparatus for adding to a water supply for animals a small, regulated quantity of a liquid additive.

The practice of adding supplements and drugs to the water supply of livestock and poultry has been in use commercially for a number of years. Examples of such applications are the feeding of coccidiostats at low levels to chicks and turkey poults during part of the rearing period, the use of anit-foaming agents ("Pluronics") in drinking water in New Zealand for control of bloat, and feeding magnesium acetate in the water supply to control hypomagnesaemia in cattle. Usually these additives have been combined with the water supply manually, but there has recently been proposed a proportioning device for metering magnesium acetate solution into a drinking trough by use of a venturi effect. In this known device a ballcock controls the level of water in a drinking trough, the ballcock valve being supplied with water from the mains. In the ballcock valve there is included a venturi which draws a liquid additive from an adjacent container and mixes the additive with the water entering into the trough whenever the ballcock valve is open. Because of the nature of such a venturi arrangement, the quantity of additive combined with the main water supply is not accurately controlled and is dependent upon the rate of water flow past the venturi. This rate of flow may vary with water pressure, and the amount of air entrained in the venturi. Furthermore the proportion of additive combined at the beginning and end of each flow of water when the ballcock opens will be imprecise as the venturi effect will vary at the beginning and end of the flow of water. However the addition of magnesium acetate to drinking water for cattle requires a proportion in the region of 1 to 80. The amount of additive to be combined is not critical, and the consequences for the cattle are not severe if the amount of additive varies slightly.

However there are other liquid additives which have been proposed for combining with drinking water for cattle but which would require very accurate metering of the additive into the drinking water, in order to avoid detrimental effects which would arise from an overdose. One example is the proposed use of copper sulphate in drinking water for controlling either simple or induced copper deficiency in cattle. The use of such an additive has not proved possible in practical circumstances since no suitable device has been available for metering the additive with sufficient accuracy.

Copper deficiency is widespread in the U.K. and also in many countries overseas which depend on pastoral economies. The methods of control of copper deficiency in grazing cattle which have been used previously have been unsatisfactory for a variety of reasons. Free choice mineral supplementation gives inadequate control, as demonstrated by a recent trial in which observations showed that 40% of the animals in the trial did not consume sufficient of the mineral to bring blood coppers to a level which would be considered adequate. This trial confirmed reports from farmers that the free choice supplementation system was not controlling the problem of copper deficiency. The injection of copper complexes is unsatisfactory because this method requires the injection to be repeated at intervals at a frequency depending upon the factors which have caused the deficiency. The repeated injections in turn involve individual handling of the animals, which handling is expensive, time consuming and on some occasions impracticable. Up to the present date, there has not been available any metering device having sufficient accuracy to be practicable for adding a liquid copper sulphate additive to drinking water.

According to the present invention there is provided flow apparatus comprising supply means for providing a supply of a primary liquid, a primary tube communicating with the supply means for delivering primary liquid from an inlet of the primary tube to an outlet of the primary tube, the said outlet being situated at a lower level than the said inlet, a container for a secondary liquid, and a secondary tube leading from an inlet thereof communicating with the said container to a junction of the secondary tube with the primary tube for sucking secondary liquid from the container in the primary tube upon flow of primary liquid through the primary tube, the said junction being situated between the inlet and the outlet of the primary tube and at a level higher than the inlet of the secondary tube, the arrangement being such that in operation the rate of flow of primary liquid past the junction is less than that required to cause any substantial venturi effect, and the secondary liquid is sucked into the primary tube at least predominantly by the effect of displacement of the liquid in the primary tube below the said junction.

Preferably there is provided in the primary tube a restriction or choke extending along the primary tube over a region including the junction of the secondary tube with the primary tube. Preferably the restriction is such as to reduce the radius of the primary tube in the said region to a value lying in the range of one-half to three-quarters of the radius of the primary tube outside the said region.

Preferably the said outlet of the primary tube is arranged during operation to be open to atmospheric pressure, and preferably the capacity of the primary tube below the said junction is greater than the capacity of the secondary tube. Where a constriction is provided, it is preferred that the capacity of the primary tube below the said junction is greater than the sum of the capacity of the secondary tube and the capacity of the restricted region of the primary tube.

Preferably the junction of the secondary tube with the primary tube comprises an extension of the secondary tube which extends into the interior of the primary tube, preferably at right angles to the primary tube. Preferably the secondary tube extension terminates substantially at the centre of the interior of the primary tube, and preferably the end of the secondary tube extension has an end face at an angle, preferably 45°, to the axis of the secondary tube extension. Conveniently the secondary tube extension may comprise a hypodermic needle.

Preferably the container for the secondary liquid (the secondary container) is open to the atmosphere at its top and has the inlet of the secondary tube positioned at or near the bottom of the secondary container at a level below the level of secondary liquid in the secondary container maintained during normal operation. Preferably there is provided a secondary liquid reservoir with a metering device arranged to maintain the level in the secondary container at a substantially constant level during operation.

In a convenient arrangement according to the invention, the said supply means includes control means for flowing along the primary tube a predetermined quantity of primary liquid, the dimensions of the primary and secondary tubes and the general arrangement of the apparatus being selected to be such that when the control means passes down the primary tube the said predetermined quantity of primary liquid the primary tube runs full substantially immediately that the control means begins to pass the primary liquid. In particular, where a restriction (sometimes called a choke) is provided in the primary tube, the restriction is preferably sufficiently narrow to ensure that suction commences immediately through the secondary tube upon flow of primary liquid in the primary tube, and yet is sufficiently wide to allow enough flow down the primary tube to ensure that the primary tube runs full as soon as a flow of primary liquid commences down the primary tube.

Preferably the said supply means comprises a container for primary liquid (the primary container) positioned with the inlet of the primary tube communicating with the primary container at or near the bottom of the primary container, and having control means for allowing a controlled flow of primary liquid from the primary container down the primary tube by means of gravity. Preferably the control means comprises a self-priming syphon arranged to syphon at intervals a predetermined quantity of primary liquid down the primary tube. Conveniently the syphon may be arranged to operate whenever the level of primary liquid in the primary container rises to a predetermined level. Primary liquid may be fed to the primary container continuously or under a further flow control means.

In a particular application of the invention, for example for adding a liquid additive to drinking water for cattle, there is provided a third container for receiving the mixture of primary and secondary liquids, the third container being open to the atmosphere at its top, and being positioned to receive the mixture of liquids from the outlet of the primary tube, the third container being provided with a further control means, for example a ballcock, for passing a flow of primary liquid from a source, such as mains water, to the said primary container whenever the level in the third container falls below a predetermined minimum. In such a preferred arrangement, the further control means is arranged to feed primary liquid to the primary container when the level in the third container falls below the said minimum level, and continues to pass primary liquid to the primary container until the first mentioned control means passes a charge of primary liquid down the primary tube to restore the level in the third container above the said minimum level. In this way at intervals the third container is replenished from time to time as necessary with the required mixture of primary and secondary liquid. In the application of the present invention to the adding of a liquid additive to drinking water for cattle, the third container constitutes a drinking trough, the primary liquid is constituted by water, and the secondary liquid is constituted by the liquid additive. Thus in accordance with a particularly preferred arrangement according to the invention the said supply means comprises a primary container for primary liquid and there is provided a third container for receiving the mixture of primary and secondary liquids from the outlet of the primary tube, the said primary container being provided with first control means for allowing a controlled flow of primary liquid from the primary container down the primary tube, the said first control means being arranged to operate whenever the level of primary liquid in the primary container rises above a predetermined level, and the said third container being provided with further control means for passing a flow of primary liquid from a source of primary liquid to the primary container whenever the level of liquid in the third container falls below a predetermined level, the further control means being arranged to continue to pass primary liquid to the primary container until the first mentioned control means passes a charge of primary liquid down the primary tube to restore the level in the third container above the said minimum level. Again where such an arrangement is used for the adding of a liquid additive to drinking water for cattle, the third container constitutes a drinking trough, the primary liquid is constituted by water, and the secondary liquid is constituted by the liquid additive.

There is also provided in accordance with the present invention a method of combining two liquids comprising the steps of flowing down a primary tube a primary liquid past a junction of the primary tube with a secondary tube, sucking through the secondary tube into the primary tube a secondary liquid from a container for secondary liquid, and delivering at an outlet of the primary tube a mixture of the two liquids, the said primary liquid being flowed past the said junction at a rate of flow which is less than that required to cause any substantial venturi effect, and the secondary liquid being sucked into the primary tube at least predominantly by the effect of displacement of the liquid in the primary tube below the said junction.

Preferably the said primary liquid is flowed down the primary tube by gravity, and preferably the said outlet of the primary tube is open to atmospheric pressure. Preferably the step of flowing the primary liquid past the said junction comprises flowing the liquid through a restriction or choke extending along the primary tube over a region including the junction.

Preferably the primary liquid is flowed down the primary tube at a rate such that the primary tube runs full substantially immediately after commencement of the flow. Preferably the suction effect at the secondary tube is arranged to be sufficient for the suction tube to run full substantially immediately after the commencement of primary flow past the said junction.

An embodiment of the invention will now be described by way of example with reference to the accompanying drawings in which.

Figure 1:
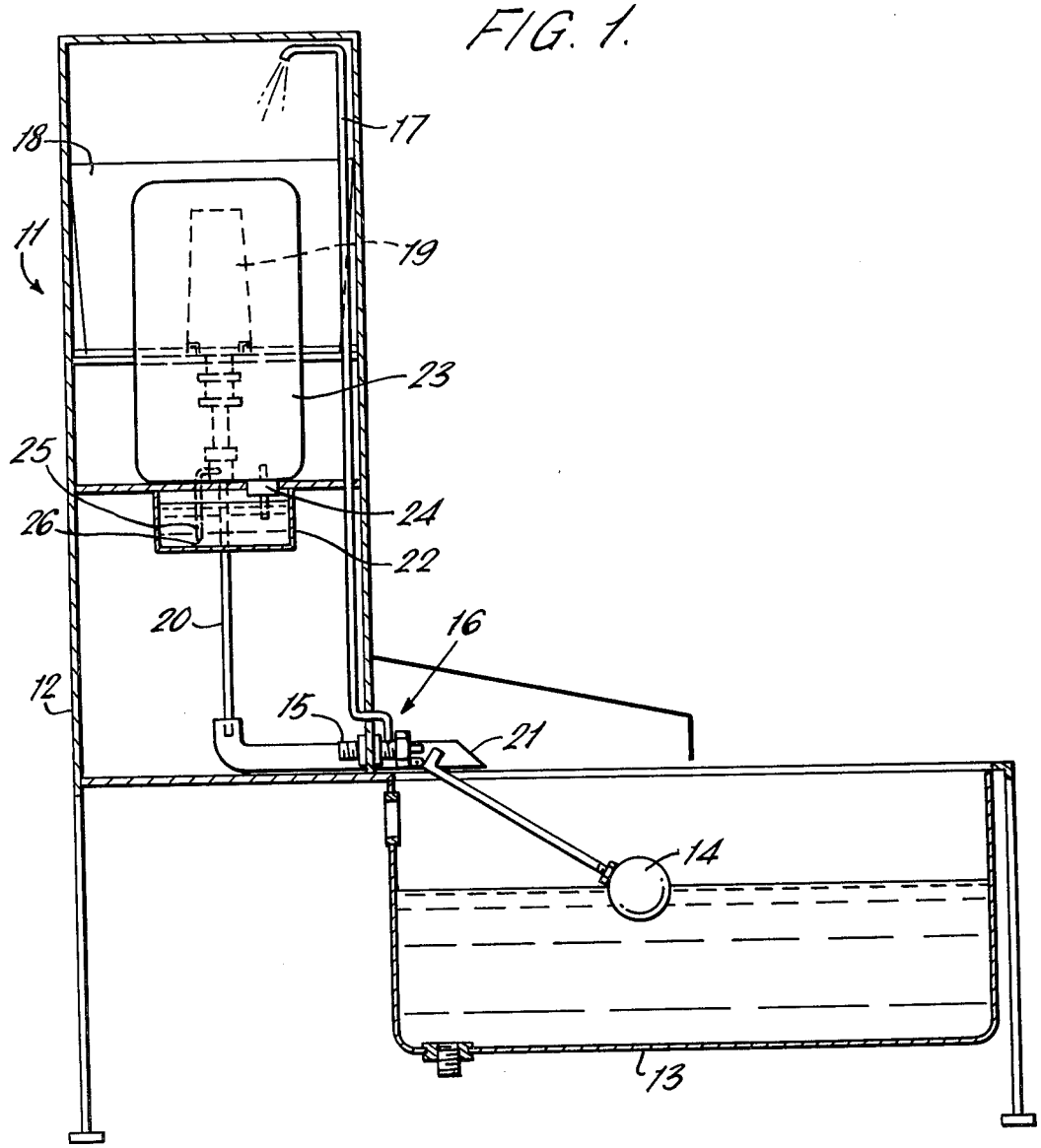
FIG. 1 is a side view, partly in section, of a flow apparatus embodying the invention for adding a liquid additive to a supply of drinking water to a cattle trough.
Figure 2:
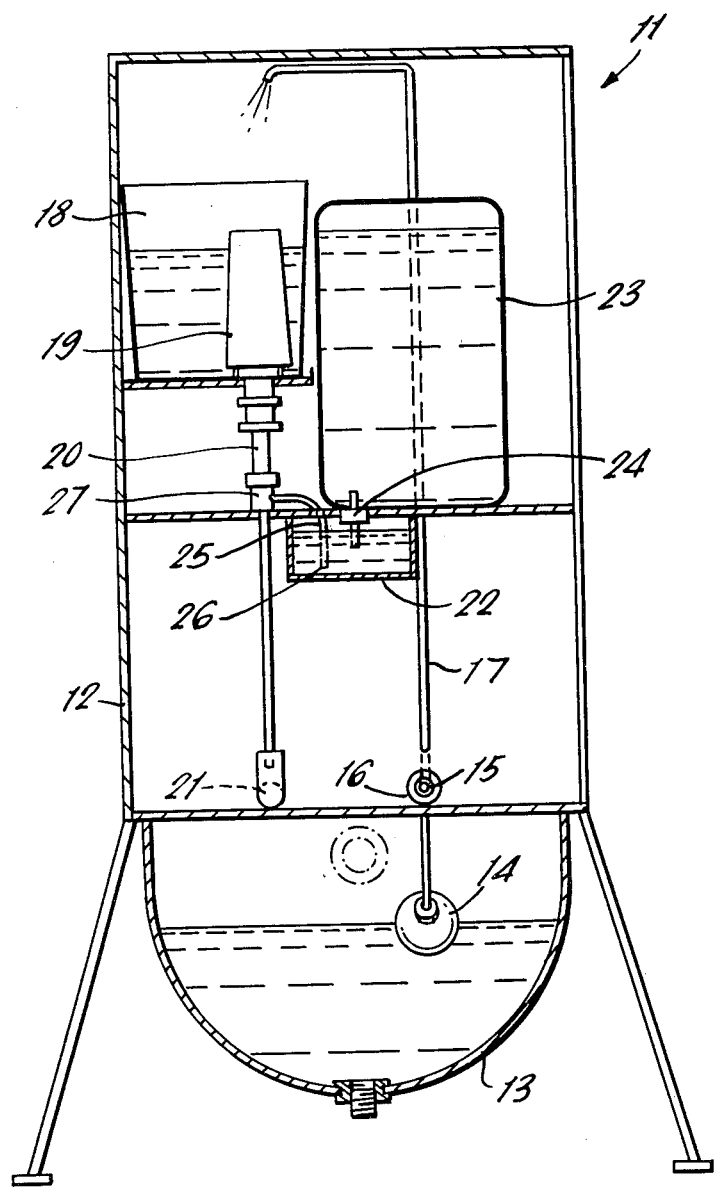
FIGS. 2 and 3 are end and plan views respectively, partly in section, of the apparatus shown in FIG. 1.
Figure 3:
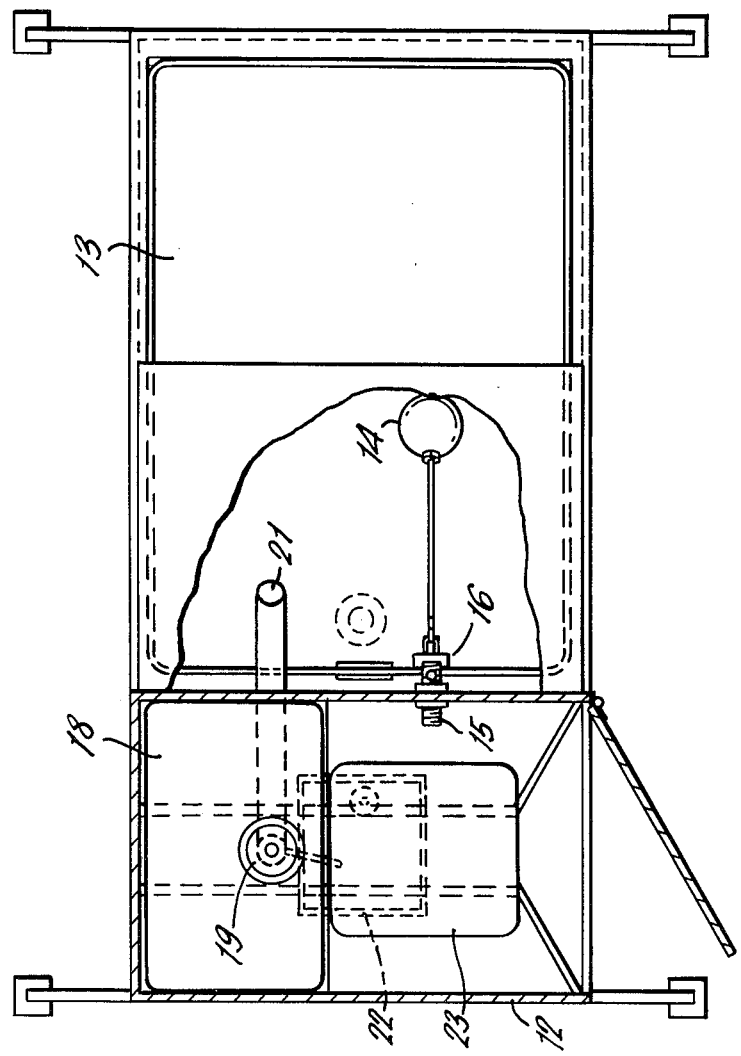

Referring initially to FIGS. 1 to 3, a flow apparatus 11 suitable for example for adding copper sulphate in the form of a liquid additive to drinking water for cattle, comprises a main frame 12 supporting a number of liquid containers and flow tubes. At the base of the frame 12 a drinking trough 13 is fitted with a Garston-type ballcock for controlling a supply of water passing into the valve of the ballcock 14 from a pipe 15 coupled to the mains water supply. An outlet from the ballcock valve 16 passes up a further pipe 17 to a header tank 18 supported at the top of the main frame 12.

In the header tank 18 is provided an automatic self-priming syphon (which may be for example an Enfield Automatic Urinal Syphon BS 1876) having an outlet coupled to the top of a primary tube 20. The primary tube 20 has its inlet coupled to the syphon 19 and has an outlet 21 leading to the drinking trough 13 but positioned at a height greater than the maximum level of liquid in the drinking trough 13 during normal operation.

The main frame 12 also supports at about the middle of its height a tray 22 arranged to contain a liquid additive, for example copper sulphate. Above the additive tray 22 is provided an additive reservoir 23 having in its base a control device 24 arranged to maintain the level of additive in the tray 22 at a predetermined substantially constant level.

Associated with the additive tray 22 is a secondary tube 25 which leads from an inlet 26 of the tube 25 to a junction 27 of the tube with the primary tube 20. The inlet 26 of the tube 25 is positioned close to the bottom of the additive tray 22 and is arranged to be always below the level of liquid additive in the tray 22.

Figure 4:
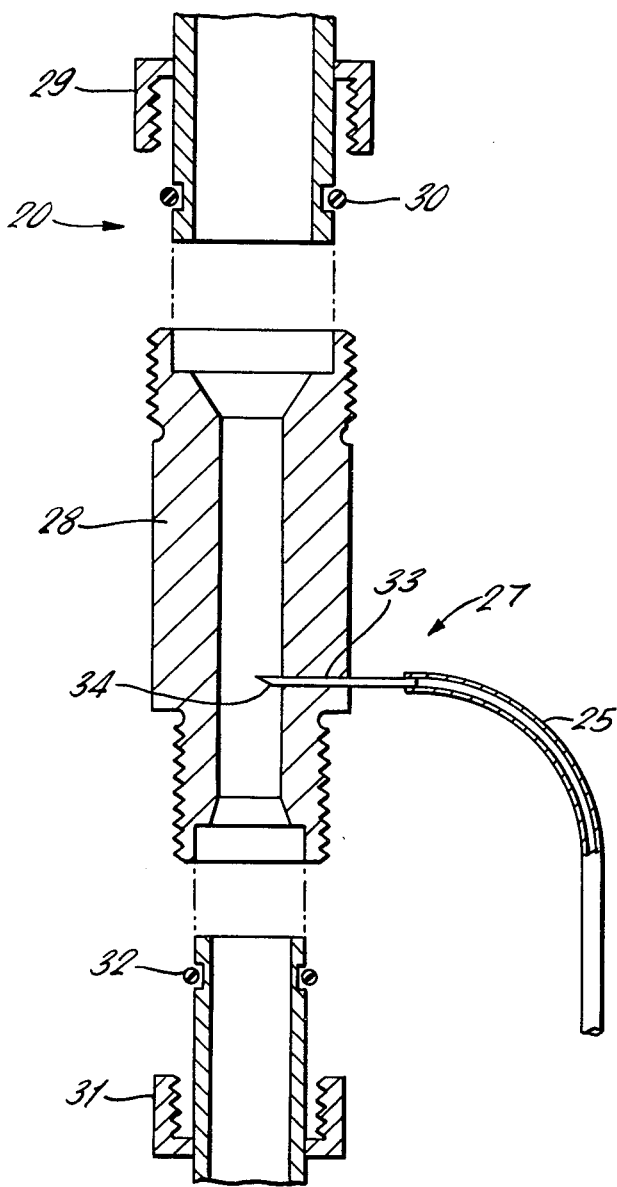
FIG. 4 is a cross-section of part of the apparatus shown in FIGS. 1 and 2, the part shown including a restriction or choke in a flow pipe, and being shown in a partly exploded representation.

Referring now to FIG. 4 the primary tube 20 includes a restriction or choke 28 coupled into the tube 20 by an upper compression cap nut 29 and O-ring seal 30 and by a lower compression cap nut 31 and lower O-ring seal 32. In this description the primary tube 20 is taken to be the entire tube including the components of the choke 28.

The secondary tube 25 joins the primary tube 20 at the junction 27 by way of a secondary tube extension 33 which enters the choke 28 at right angles to the axis of the choke conduit. Conveniently the secondary tube extension 33 comprises a hypodermic syringe needle. Conveniently the syringe needle 33 terminates substantially at the centre of the interior of the choke 28, and has an end face 34 at 45° to the axis of the syringe needle 33, facing downwardly.

There will now be described a summary of the operation of the embodiment shown in the Figures. When the level of water in the drinking trough 13 falls as the animals drink, the float of the ballcock 14 falls and allows water to flow up the pipe 17 to the header tank 18. This water continues to flow until the level in the header tank 18 is sufficient to prime the automatic syphon 19 which then discharges an approximately predetermined quantity of water down the primary pipe 20 into the drinking trough 13. It is not necessary that this quantity of water passing is accurately regulated. As the water flows through the restriction 28, the liquid additive is sucked up the secondary tube 25 from the additive tray 22 and is added to the liquid passing down the lower part of the primary tube 20 into the drinking trough 13.

The feature of the construction and method of operation of the device described which embodies the invention is that the rate of flow of liquid past the junction 27 is arranged to be less than that required to cause any substantial venturi effect at the end face 34 of the needle 33, and the arrangment is such that the additive from the tray 22 is sucked into the primary tube at least predominantly by the effect of displacement of water in the primary tube 20 below the junction 27. Examples of the dimensions of the elements, and the materials for construction, which may be used will be given hereinafter, but these factors are chosen in the example shown in such a manner as to produce substantially no venturi effect at the junction 27, and to effect the suction in the secondary tube 25 substantially wholly by displacement of liquid in the primary tube 20 below the junction 27. It is important to the working of the system that the water in the primary tube 20, having passed through the choke 28, is in sufficient volume to fill completely and instantly the part of the primary tube 20 below the junction 27. This is to ensure that the column of water dropping down the lower part of the primary tube 20 produces negative pressure in the choke conduit 28 so that the liquid additive in the tray 22 is immediately sucked into the choke 28 along the tube 25. The balance between the capacity of the primary tube 20 below the junction 27 and the capacity of the sum of the choke 28 and the secondary tube 25 must be carefully selected. Too narrow a choke 28 will not allow the lower part of the primary tube 20 to fill quickly enough to act in the manner of a piston of a displacement pump. Too large a diameter of the choke 28 will not create sufficient suction to prime the secondary tube 25 immediately the flow through the primary tube 20 commences. Since the proportion of additive added to the drinking water depends upon the flow in the secondary tube 25 in relation to the flow in the primary tube 20, this relationship can only be maintained constant if both the lower part of the primary tube 20, and the secondary tube 25, both run full immediately a downflow of water through the primary tube 20 commences. The operation of the liquid falling in the primary tube 20 as the "piston" of a displacement pump contrasts with the effect which occurs in known additive metering devices where the additive is added to the main flow by a venturi. Where a venturi is used the main tube does not run full, and the amount of additive sucked into the main tube varies with flow through the venturi, with the result that considerable variation in the proportion of additive added occurs. In the embodiment of the invention shown, where it is arranged that both the primary tube 20 and the secondary tube 25 run full immediately a flow starts through the primary tube 20, ensures that the proportions of additive flowing up the tube 25 to the main liquid flowing down the tube 20 are maintained constant.

The fact that the secondary tube 25 draws the additive from the additive tray 22 at a lower level than the junction 27 ensures that no additive can reach the drinking trough 13 unless the primary tube 20 is running full. This provides a fail-safe feature of the system in that the concentration of additive cannot rise above the predetermined level. The required concentration of additive in the trough 13 is conveniently adjusted by altering the concentration of the solution in the additive reservoir 23.

Examples will now be given of dimensions of, and materials used for, the various elements of the embodiment described. The frame 12 is conveniently of a size such as to provide 6 foot head of water which can be provided by a mains pressure above 2½ lbs p.s.i. Provided the mains pressure is above this limit, the system is independent of variations in the pressure of the incoming water. This is in contrast to a known venturi type of additive injector where the amount of additive injected by the venturi is dependent upon variations in the pressure of the incoming water. The main parts of the primary tube 20 are conveniently constructed of ¾ inch polythene piping and the choke portion 28 of the primary tube 20 is conveniently a 3 inch long (external dimension) nylon tube having an internal restricted diameter of about 10 mm, for example 10.3 mm. The included angle at the top and bottom of the choke 28 in the internal profile may be 60°, and the needle 33 conveniently enters the choke 28 at a distance ¾ inch above the beginning of the restricted portion, that is to say at the lower edge of the chamferred part of the profile. The total length of the effective part of the choke 28, that is to say between the beginnings of the chamferred inlet and outlet, is conveniently 2½ inches. It is found that in general the junction 27 should be positioned lower than half way down the choke and higher than a quarter way up the choke. As shown an optimum position is two-thirds of the way down the effective length of the choke.

Conveniently the hypodermic needle may be a standard 18 s.w.g. needle and the secondary tube 25 is conveniently a Portex 800/000/150 pick-up tube. Such a tube has an internal diameter of 1.4 mm. Conveniently the lower portion of the primary tube 20 below the choke 28 is formed of standard ½ inch polythene tubing of British Standard BS 1972 type C. The upper portion of the primary tube 20 is conveniently of standard ¾ inch polythene tubing of British Standard BS 1972 class C. The additive tray 22 is supplied conveniently from a 5 gallon additive reservoir 23 which is inverted over the tray and feeds it through a ¼ inch hard plastic tube sealed by a rubber grommet into the conventional screw cap of such a 5 gallon additive reservoir. In such a case the said metering device 24 for keeping a constant level in the tray 22 merely consists of the said hard plastic tube. The tube allows additive liquid to flow from the reservoir 23 into the tray 22 only when the level in the tray 22 falls below the end of the tube 24.

By way of example the embodiment shown is suitable for adding up to 2 microgrammes per milliliter of copper to the drinking water of grazing cattle, which level has been shown experimentally to be adequate for controlling induced copper deficiency in cattle on a semi synthetic diet. Where daily small supplements of cobalt and selenium are required it is also possible to provide these with a similar apparatus. The system can also be used for low level drug or trace element supplementation for housed animals, using the trough as a supply tank for water bowls or constant level drinkers. The addition of nutrient solutions to irrigation water in glasshouse crops (e.g. tomatoes) may also be effected by an embodiment of the invention.

When tested with additive solutions giving a mean copper concentration in the drinking trough of 0.85 microgrammes per milliliter, the standard deviation of copper in successive fillings of the trough was ±0.02 microgrammes per milliliter.

In an alternative embodiment the following values of concentrations were obtained in a test using a 23/64 inch choke with a 16 s.w.g. needle at the junction of the primary and secondary tubes. Duplication of concentration of copper in the drinking water was found to be excellent.

| Additive Concentration | Drinking Water Concentration |
| --- | --- |
| 200 microgrammes per ml. | 1.44 microgrammes per ml. |
|  | 1.44 microgrammes per ml. |
|  | 1.43 microgrammes per ml. |
|  | 1.45 microgrammes per ml. |
|  | 1.44 microgrammes per ml. |
|  | 1.42 microgrammes per ml. |
|  | 1.80 microgrammes per ml. |

| Additive Concentration | Drinking Water Concentration |
| --- | --- |
| -continued | |
|  | 1.78 microgrammes per ml. |

Thus embodiments of the present invention can be constructed which provide a system to ensure that animals using the system are forced to ingest the required additive element at the correct level, the system being simple and cheap. The system requires virtually no maintenance other than filling the additive reservoir, and includes a fail-safe feature to prevent excess proportions of additive being added to the drinking water. Furthermore the system requires no external power supply, permitting it to be used in most field conditions.

I claim:

1. Flow apparatus for combining liquids in constant proportions comprising:

supply means for providing a supply of a primary liquid;

a primary tube communicating with said supply means for delivering primary liquid from an inlet of said primary tube to an outlet of said primary tube, said primary tube outlet being situated at a lower level than said primary tube inlet;

said supply means comprising a primary container for primary liquid and a first control means for passing a charge of primary liquid from said primary container down said primary tube, said control means being arranged to operate whenever the level of primary liquid in the primary container rises above a predetermined level;

a container for a secondary liquid;

a secondary tube leading from an inlet thereof which communicates with said secondary liquid container to a junction of said secondary tube with said primary tube for sucking secondary liquid from said secondary liquid container into said primary tube upon flow of said primary liquid through said primary tube;

said junction being situated between said upper inlet of said primary tube and said lower outlet of said primary tube, and at a level higher than said inlet of said secondary tube; said primary tube and said secondary tube being arranged such that, in the absence of flow of primary liquid in said primary tube, said primary and secondary tubes are both empty in the region of said junction and between said junction and said outlet of said primary tube; and said supply means being arranged to pass primary liquid down said primary tube in such a manner that the rate of flow of primary liquid past said junction is less than that required to cause any substantial velocity-related entrainment effect, and said secondary liquid is sucked into said primary tube substantially by the effect of displacement of the liquid in said primary tube below said junction;

a third container for receiving the mixture of primary and secondary liquids from the outlet of said primary tube; and further control means for passing a flow of primary liquid from a source of primary liquid to said primary container whenever the level of liquid in said third container falls below a predetermined level, said further control means being arranged to continue to pass primary liquid to said primary container until said first mentioned control means passes sufficient primary liquid down said primary tube to restore the level of said third container above said minimum level.

2. Apparatus according to claim 1 in which either or both of the primary and third containers is or are open to the atmosphere at the top thereof.

3. Apparatus according to claim 1 in which said first control means comprises a self-priming syphon pump.

4. Apparatus according to claim 1 in which said further control means comprises a ball-cock type float valve.

5. Apparatus according to claim 1 in which said first, second and third containers are all in communication with atmospheric pressure, and the arrangement is such that the pressure of liquid flowing in said primary tube is determined only by the head of liquid in said primary container.

6. Apparatus according to claim 1 in which the said container for secondary liquid is open to the atmosphere at its top and has the inlet of the secondary tube positioned at or near the bottom of the secondary container at a level below the level of secondary liquid in the secondary container maintained during normal operation.

7. Apparatus according to claim 1 in which the outlet of the primary tube is arranged during operation to be open to atmospheric pressure.

8. Apparatus according to claim 1 in which there is provided in the primary tube a restriction extending along the primary tube over a region including the junction of the secondary tube with the primary tube.

9. Apparatus according to claim 8 in which the restriction in such as to reduce the radius of the primary tube in the said region to a value lying in the range of one half to three quarters of the radius of the primary tube outside the said region.

10. Apparatus according to claim 8 in which the capacity of the primary tube below the said junction is greater than the capacity of the secondary tube.

11. Apparatus according to claim 10 in which the capacity of the primary tube below the said junction is greater than the sum of the capacity of the secondary tube and the capacity of the restricted region of the primary tube.

12. Apparatus according to claim 1 in which the junction of the secondary tube with the primary tube comprises an extension of the secondary tube which extends into the interior of the primary tube.

13. Apparatus according to claim 12 in which the extension of the secondary tube extends into the interior of the primary tube substantially at right angles to the primary tube.

14. Apparatus according to claim 12 in which the secondary tube extension terminates substantially at the centre of the interior of the primary tube.

15. Apparatus according to claim 12 in which the end of the secondary tube extension has an end face inclined at substantially 45° to the axis of the secondary tube extension.

16. Apparatus according to claim 1 in which the dimensions of the primary and secondary tubes and the general arrangement of the apparatus are selected to be such that when the control means passes primary liquid down the primary tube, the primary tube runs full substantially immediately that the supply means begins to pass the primary liquid.

17. Apparatus according to claim 16 in which the primary tube in the region of the junction is sufficiently narrow to ensure that suction commences immediately through the secondary tube upon flow of primary liquid in the primary tube, and yet is sufficiently wide to allow enough flow down the primary tube to ensure that the primary tube runs full as soon as a flow of primary liquid commences down the primary tube.

18. Flow apparatus for combining liquids in constant proportions comprising:
 supply means for providing a supply of a primary liquid;
 a primary tube communicating with said supply means for delivering primary liquid from an inlet of said primary tube to an outlet of said primary tube, said primary tube outlet being situated at a lower level than said primary tube inlet;
 a container for a secondary liquid; and
 a secondary tube leading from an inlet thereof which communicates with said secondary liquid container to a junction of said secondary tube with said primary tube for sucking secondary liquid from said secondary liquid container into said primary tube upon flow of said primary liquid through said primary tube;
 said junction being situated at a height between the height of said upper inlet of said primary tube and the height of said lower outlet of said primary tube, and at a level higher than said inlet of said secondary tube; said primary tube and said secondary tube being arranged such that, in the absence of flow of primary liquid in said primary tube, said primary and secondary tubes are both empty in the region of said junction and between said junction and said outlet of said primary tube; and said supply means being arranged to pass primary liquid down said primary tube in such a manner that the rate of flow of primary liquid past said junction is less than that required to cause any substantial velocity-related entrainment effect, and said secondary liquid is sucked into said primary tube substantially by the effect of displacement of the liquid in said primary tube below said junction.

19. Apparatus according to claim 18 in which the dimensions of said primary and secondary tubes, and the general arrangement of the apparatus, are selected to be such that when said supply means passes primary liquid down said primary tube, said primary tube runs full substantially immediately that said supply means begins to pass said primary liquid.

20. Apparatus according to claim 18 in which said outlet of said primary tube is arranged during operation to be open to atmospheric pressure.

21. Apparatus according to claim 18 in which said primary tube in the region of the junction is sufficiently narrow to ensure that suction commences immediately through the secondary tube upon flow of primary liquid in said primary tube, and yet is sufficiently wide to allow enough flow down said primary tube to ensure that said primary tube runs full as soon as a flow of primary liquid commences down said primary tube.

22. Apparatus according to claim 18 in which said supply means is arranged to pass intermittently down the primary tube a charge of primary liquid of quantity and rate of delivery into the primary tube such that the rate of flow of primary liquid past said junction is less than that required to cause any substantial velocity-related entrainment effect and said secondary liquid is sucked into the primary tube substantially by the effect of displacement of the liquid in the primary tube below the said junction.

23. Apparatus according to claim 22 in which said container for secondary liquid is open to the atmosphere at its top and has said inlet of said secondary tube positioned at a level below the level of secondary liquid maintained in the secondary container during normal operation.

24. Apparatus according to claim 18 in which there is provided in said primary tube a restriction extending along the primary tube over a region including the junction of said secondary tube with said primary tube.

25. Apparatus according to claim 24 in which said restriction is such as to reduce the radius of said primary tube in said region to a value lying in the range of one-half to three-quarters of the radius of primary tube outside the said region.

26. Apparatus according to claim 24 in which the capacity of said primary tube below the said junction is greater than the capacity of said secondary tube.

27. Apparatus according to claim 26 in which the capacity of said primary tube below the said junction is greater than the sum of the capacity of said secondary tube and the capacity of said restricted region of said primary tube.

28. Apparatus according to claim 24 in which said junction of said secondary tube with the primary tube comprises an extension of said secondary tube which extends into the interior of said primary tube.

29. Apparatus according to claim 28 in which said extension of said secondary tube extends into the interior of said primary tube substantially at right angles to said primary tube.

30. Apparatus according to claim 28 in which said secondary tube extension terminates substantially at the center of the interior of said primary tube.

31. Apparatus according to claim 28 in which the end of said secondary tube extension has an end face inclined at substantially 45° to the axis of said secondary tube extension.

* * * * *